(12) United States Patent
Kasahara

(10) Patent No.: US 10,908,545 B2
(45) Date of Patent: Feb. 2, 2021

(54) APPARATUS WITH LIFETIME PREDICTION, CONTROL METHOD OF APPARATUS AND STORAGE MEDIUM

(71) Applicant: CANON KABUSHIKI KAISHA, Tokyo (JP)

(72) Inventor: Aya Kasahara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/691,677

(22) Filed: Nov. 22, 2019

(65) Prior Publication Data

US 2020/0192265 A1 Jun. 18, 2020

(30) Foreign Application Priority Data

Dec. 12, 2018 (JP) .................................. 2018-232657

(51) Int. Cl.
*G03G 15/00* (2006.01)
*G06F 3/12* (2006.01)

(52) U.S. Cl.
CPC ....... *G03G 15/553* (2013.01); *G03G 15/5016* (2013.01); *G06F 3/1229* (2013.01)

(58) Field of Classification Search
CPC .............. G03G 15/553; G03G 15/556; G03G 15/5016; H04N 1/00344; H04N 1/00408; G06F 3/121; G06F 3/1219; G06F 3/1229; G06K 15/4075
USPC .................................. 399/11, 25, 27, 31, 81
See application file for complete search history.

(56) References Cited

U.S. PATENT DOCUMENTS

| | | | |
|---|---|---|---|
| 7,725,293 B2* | 5/2010 | Bonissone | G06N 5/04 702/183 |
| 9,046,854 B2* | 6/2015 | Yang | G03G 15/556 |
| 10,598,735 B2* | 3/2020 | Lee | G01R 31/382 |
| 2008/0131146 A1* | 6/2008 | Kendall | G03G 15/553 399/27 |
| 2008/0288210 A1 | 11/2008 | Imahara | |
| 2012/0143564 A1* | 6/2012 | Li | G05B 23/0283 702/179 |

FOREIGN PATENT DOCUMENTS

JP 2008158051 A 7/2008
JP 2008287495 A 11/2008

* cited by examiner

*Primary Examiner* — Robert B Beatty
(74) *Attorney, Agent, or Firm* — Rossi, Kimms & McDowell LLP

(57) ABSTRACT

An apparatus which is capable of attaching maintenance part that needs replacement accompanying use and includes: storage unit configured to store a prediction equation of a life of the maintenance part in a plurality of patterns in a storage device; reception unit configured to receive, from a user, switching instructions to switch a prediction equation currently being applied to a prediction of a life of the maintenance part to one of a plurality of patterns of a prediction equation stored in the storage unit for the maintenance part; switching unit configured to switch a prediction equation currently being applied to a prediction of a life of the maintenance part to a prediction equation specified by the switching instructions; and presentation unit configured to present identification information on a prediction equation currently being applied to a prediction of a life of the maintenance part to a user.

14 Claims, 8 Drawing Sheets

| MAINTENANCE PART 301 | MODEL NUMBER 302 | MAINTENANCE PART ID 303 | PREDICTION EQUATION ID CURRENTLY BEING APPLIED 304 | DEGREE OF USE (%) 305 | NUMBER OF REMAINING DAYS (DAY) 306 | PREDICTION EQUATION ID RESERVED 307 |
|---|---|---|---|---|---|---|
| BLACK TONER CONTAINER | NTG-YYY | TONER-K | LGC_1_TONER-K | 100 | 0 | — |
| YELLOW TONER CONTAINER | NTG-YYY | TONER-Y | LGC_1_TONER-Y | 97 | 5 | — |
| MAGENTA TONER CONTAINER | NTG-YYY | TONER-M | LGC_1_TONER-M | 76 | 41 | — |
| CYAN TONER CONTAINER | NTG-YYY | TONER-C | LGC_1_TONER-C | 64 | 59 | — |
| COLLECTED TONER CONTAINER | WT-XXX | WST-TNR | LGC_1_WST-TNR | 10 | 371 | LGC_3_WST-TNR |
| BLACK PHOTOCONDUCTOR DRUM | NPG-ZZZ | PT-DRM | LGC_1_PT-DRM | 92 | 13 | LGC_2_PT-DRM |
| YELLOW PHOTOCONDUCTOR DRUM | NPG-ZZZ | PT-DR-Y | LGC_1_PT-DR-Y | 53 | 86 | LGC_2_PT-DR-Y |
| MAGENTA PHOTOCONDUCTOR DRUM | NPG-ZZZ | PT-DR-M | LGC_1_PT-DR-M | 76 | 41 | LGC_2_PT-DR-M |
| CYAN PHOTOCONDUCTOR DRUM | NPG-ZZZ | PT-DR-C | LGC_1_PT-DR-C | 64 | 59 | LGC_2_PT-DR-C |
| FIXING UNIT | FX-XXX | FX-UNIT | LGC_1_FX-UNIT | 2 | 432 | — |
| DOCUMENT FEED ROLLER | DR-XXX | DF-PU-RL | LGC_1_DF-PU-RL | 12 | 0 | — |

FIG.3

SITUATION CHECK/ABORT

<MAINTENANCE PART INFORMATION>

| ITEM | MODEL NUMBER | STATE | | NUMBER OF REMAINING DAYS |
|---|---|---|---|---|
| BLACK TONER (K) | NTG-YYY | | 5 % | WITHIN 7 DAYS |
| YELLOW TONER (Y) | NTG-YYY | | 5 % | WITHIN 7 DAYS |
| MAGENTA TONER (M) | NTG-YYY | | 24 % | 41 DAYS |
| CYAN TONER (C) | NTG-YYY | | 36 % | 69 DAYS |
| COLLECTED TONER CONTAINER | WT-XXX | | 90 % | 1 YEAR OR MORE |

OK

AMOUNT OF TONER (BLACK / YELLOW) HAS BECOME SMALL. PREPARE FOR REPLACEMENT.

FIG.4

APPARATUS WITH LIFETIME PREDICTION, CONTROL METHOD OF APPARATUS AND STORAGE MEDIUM

BACKGROUND OF THE INVENTION

Field of the Invention

The present invention relates to a technique to predict a life of a maintenance part that needs replacement accompanying the operation of an apparatus, in particular, an image forming apparatus.

Description of the Related Art

An electrophotographic image forming apparatus, such as a printer, a copy machine, and a facsimile, includes maintenance parts, for example, such as a toner container and a collected toner container. For the maintenance part such as this, of course replacement is necessary because of degradation over time and consumption of toner, which is a color material, and in addition, it is necessary to perform replacement at appropriate timing in order to appropriately maintain the print quality in the image forming apparatus.

In order to notify a service engineer, a user, and a person in charge of maintenance (hereinafter, described as a service engineer or the like) of a replacement time of a maintenance part, a technique to predict a life of a maintenance part has been proposed (see Japanese Patent Laid-Open No. 2008-158051). In the technique described in Japanese Patent Laid-Open No. 2008-158051, the life of a roller that conveys a sheet is derived from a prediction equation that uses the number of sheets passed, a delay rate of sheet conveyance timing (delay rate of timing at which a fed sheet reaches a sheet detection sensor to the layout value), and the like as parameters.

Further, a technique has also been proposed in which the image forming apparatus stores in advance a prediction equation in a plurality of patterns for one maintenance part and a prediction equation that is applied is selected therefrom in order to improve the accuracy of a prediction of the life of a maintenance part (see Japanese Patent Laid-Open No. 2008-287495).

SUMMARY OF THE INVENTION

The present invention has been made in view of the above-described circumstances and provides a technique that makes it possible to appropriately manage a maintenance part that is attached to an apparatus, such as an image forming apparatus, and which needs replacement accompanying the operation of the apparatus.

The apparatus according to one aspect of the present invention is an apparatus capable of attaching a maintenance part that needs replacement accompanying use, the apparatus including: a storage unit configured to store a prediction equation for predicting a life of the maintenance part in a plurality of patterns in a storage device; a reception unit configured to receive, from a user, switching instructions to switch a prediction equation currently being applied to a prediction of a life of the maintenance part to one of a plurality of patterns of a prediction equation stored in the storage unit for the maintenance part; a switching unit configured to switch a prediction equation currently being applied to a prediction of a life of the maintenance part to a prediction equation specified by the switching instructions; and a presentation unit configured to present identification information on a prediction equation currently being applied to a prediction of a life of the maintenance part to a user.

Further features of the present invention will become apparent from the following description of exemplary embodiments with reference to the attached drawings.

BRIEF DESCRIPTION OF THE DRAWINGS

FIG. 3 is a diagram showing an example of a maintenance part life management table;

FIG. 4 is a diagram showing an example of a user interface screen for setting a prediction equation;

DESCRIPTION OF THE EMBODIMENTS

With the technique described in Japanese Patent Laid-Open No. 2008-287495, a prediction equation is selected automatically, and therefore, it is not possible for a service engineer or the like to freely control a prediction equation that is set. Further, there is a case where the prediction equation stored by the image forming apparatus is automatically updated together with addition of a function at the time of updating firmware of the image forming apparatus, and therefore, there is a case where it is not possible for a service engineer or the like to freely control the timing of updating a prediction equation also. Furthermore, in a case where a prediction equation is automatically selected or updated, there is a possibility that it becomes hard to specify which prediction equation is applied to a prediction of a life of a maintenance part. As described above, conventionally, there is a case where it is not possible for a service engineer or the like to freely control a prediction equation that is set or timing at which a prediction equation is set, or to specify the prediction equation currently being applied. Because of this, there is a possibility that a prediction of a life of a prediction equation is performed by a prediction equation not intended by a service engineer or the like, and therefore, there is a possibility that management of a maintenance part is not performed appropriately.

In the following, aspects for embodying the present invention are explained by using the drawings. Components described in the following embodiments are merely indicating aspects as examples of the present invention and are not intended to limit the scope of the present invention only to those.

First Embodiment

Figure 1:
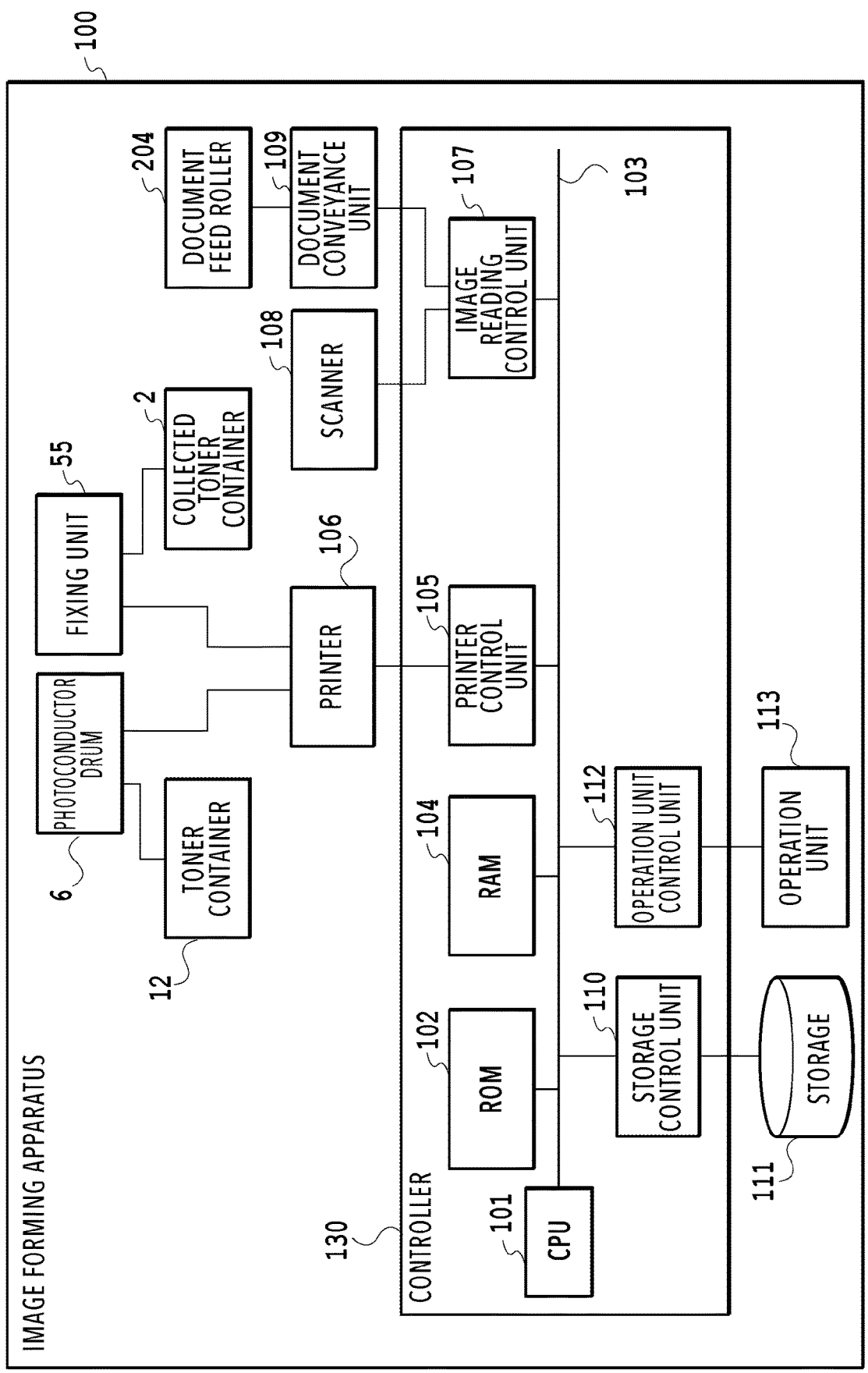
FIG. 1 is a block diagram showing an example of a system including an image forming apparatus in a first embodiment.

FIG. 1 is a block diagram showing an example of a system including an image forming apparatus 100 in a first embodiment. As shown in FIG. 1, the image forming apparatus 100 includes a controller 130. The controller 130 has a CPU 101, a ROM 102, a RAM 104, a printer control unit 105, an image reading control unit 107, a storage control unit 110, and an operation unit control unit 112. Each component possessed by the controller 130 is connected by a bus 103.

Further, the image forming apparatus 100 includes hardware, such as a storage 111, a printer 106, a scanner 108, a document conveyance unit 109, and an operation unit 113. The printer control unit 105, the image reading control unit 107, the storage control unit 110, and the operation unit control unit 112 of the controller 130 function as an interface for the CPU 101 to control each piece of hardware.

Further, it is possible for the image forming apparatus 100 to attach a large number of maintenance parts that can be replaced by a service engineer or the like. In the following, in a case where the term "user" alone is referred to simply, there is a case where the term includes not only a user but also a service engineer, a person in charge of maintenance, and the like. For example, in the printer 106, a photoconductor drum 6, a toner container 12, a fixing unit 55, and a collected toner container 2 are maintenance parts and those maintenance parts are comprised in a configuration detachable from the printer 106. For example, for the toner container 12, in a case where the remaining amount of toner possessed by the toner container 12 becomes a threshold value or less, replacement becomes necessary. On the other hand, for the collected toner container 2, in a case where the amount of toner not used for printing and stored (collected) in the container becomes a threshold value or more, replacement becomes necessary. In the document conveyance unit 109, a document feed roller 204 and the like are maintenance parts and comprised in a configuration detachable from the document conveyance unit 109. In the following, although a case is taken as an example where the printer 106 performs electrophotographic image formation, it may also be possible for the printer 106 to adopt an ink jet method of forming an image by ejecting ink, which is a color material, onto a sheet, such as paper.

The controller 130 including the CPU 101 controls the entire image forming apparatus 100. The CPU 101 boots the OS (Operating System) by a boot program stored in the ROM 102. Then, the CPU 101 executes control programs stored in the storage 111 and the ROM 102 on the OS. The RAM 104 is used as a temporary storage area, such as a main memory and a work area, of the CPU 101. The storage 111 is a readable, writable nonvolatile storage device, such as an HDD (Hard Disk Drive). In the storage 111, a variety of programs and data, such as the control program for controlling the entire image forming apparatus 100, various application programs, image data, and data indicating the degree of use and the number of days of operation of a maintenance part, are stored. The CPU 101 accesses the storage 111 via the storage control unit 110. The CPU 101 controls the image forming apparatus 100 by reading the control program and application programs from the storage 111 or the ROM 102, loading them onto the RAM 104, and executing them. As described above, the hardware, such as the CPU 101, the ROM 102, the RAM 104, and the storage 111, configuring the controller 130 configures a so-called computer.

Further, the CPU 101 reads an image on a document by controlling the scanner 108 via the image reading control unit 107 and generates image data indicating the read image. It is also possible for the CPU 101 to generate image data by controlling the document conveyance unit 109 having an ADF (Auto Document Feeder) to convey documents loaded on the document conveyance unit 109 to the scanner 108 one by one. The scanner 108 performs a scan of a document by using an optical reader, such as a CCD, and converts image information on a document, which is obtained by the scan, into an electric signal (image data). The image data obtained by the scanner 108 is stored in the storage 111. The CPU 101 forms an image on a printing medium (sheet, such as paper) based on image data and the like stored in the storage 111 in cooperation with the printer control unit 105 and the printer 106.

The operation unit control unit 112 connects the operation unit 113 and the controller 130. The operation unit 113 functions as a display unit configured to display information for presentation to a user and a reception unit configured to receive instructions from a user. The operation unit 113 includes a touch panel display that displays an operation screen, to be described later, receives an input from a user, and so on. Further, the operation unit 113 includes hard keys, such as a start key and a situation check/abort key. The situation check/abort key is a key that causes a screen being displayed on the touch panel display to make a transition into a status screen (situation check/abort screen, to be described later) for checking the status of the image forming apparatus 100, aborting a job being performed, and so on.

Figure 2:
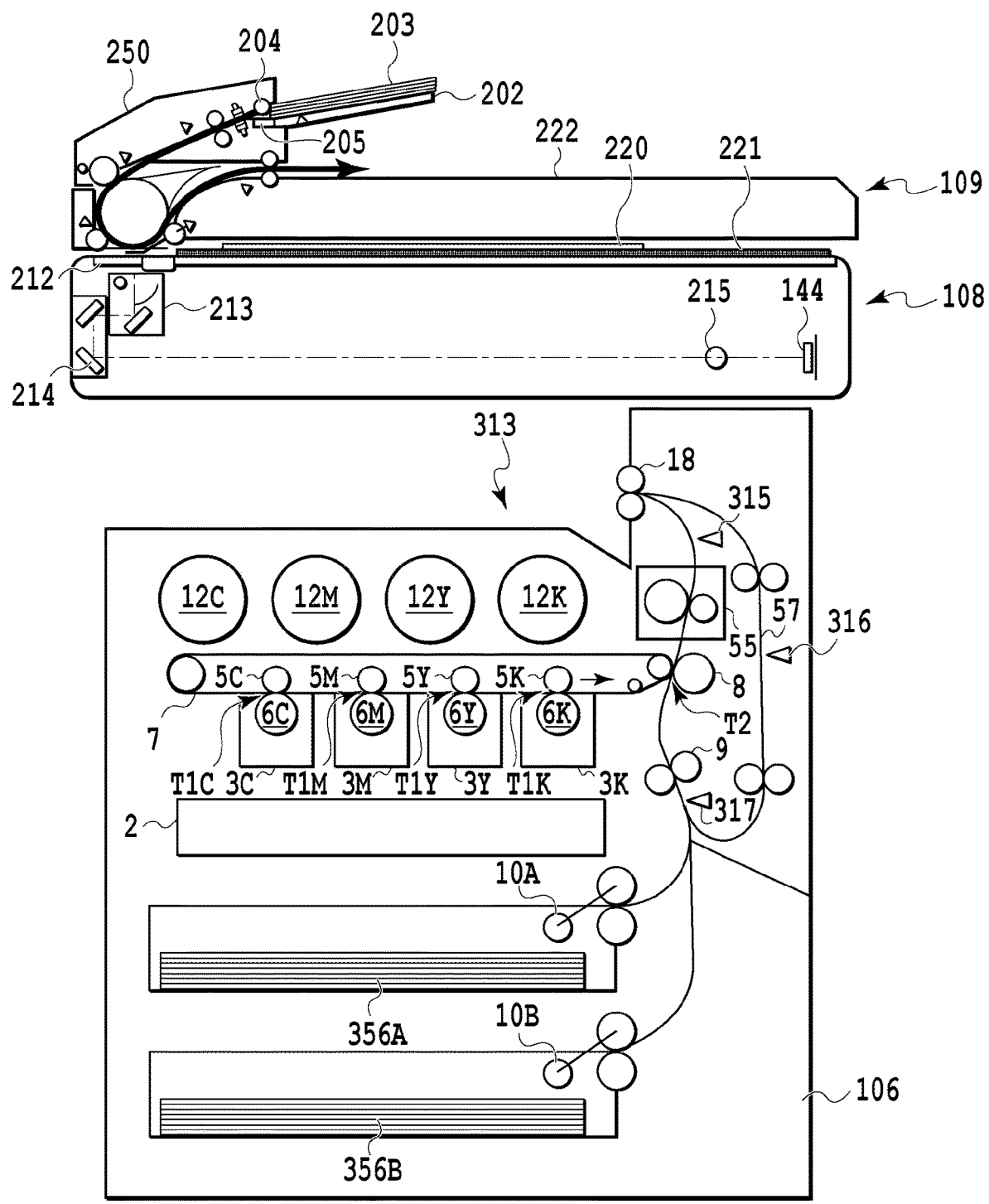
FIG. 2 is a diagram showing an example of a sectional diagram of the image forming apparatus.

Following the above, by using FIG. 2, image forming processing and reading processing in the image forming apparatus 100 are explained. FIG. 2 is a diagram showing an example of a sectional diagram of the image forming apparatus 100. Here, a full-color image forming apparatus is taken as an example. In the image forming apparatus 100, the photoconductor drums 6 (6C, 6M, 6Y, 6K) as image carriers each carrying the toner image of each color of cyan, magenta, yellow, and black are arranged in the traveling direction (horizontal direction in FIG. 2) of an intermediate transfer belt 7 as an intermediate transfer member. That is, the image forming apparatus 100 is a so-called tandem type. The image forming apparatus 100 is a so-called MFP (Multi Function Peripheral) having the scanner 108, the document conveyance unit 109, and the printer 106. The image forming apparatus 100 may be an SFP (Single Function Peripheral) not including the scanner 108 or may be a monochrome image forming apparatus, or may have a printer method other than the tandem type.

A document bundle 203 loaded on a loading unit 202 is separated one by one by a frictional force between a document feed roller 204 and a separation pad 205. The one separated document is conveyed into the conveyance path. Then, the document conveyed one by one is sent up to the reading position via the conveyance path (path indicated by a thick-line arrow in FIG. 2). Then, the document conveyed through the conveyance path in the state of being in touch with a document glass 212 is further conveyed by each roller and discharged onto a discharge tray 222. The CPU 101 implements the conveyance processing in cooperation with the document conveyance unit 109.

The image forming apparatus 100 in the present embodiment is configured so that the document feed roller 204 can be replaced by a user by supposing a case where separation of the document bundle 203 is no longer performed normally because of wear of the document feed roller 204 due to the friction with documents. A pair of the document feed roller 204 and the separation pad 205 may be configured so that a user can replace the pair. Hereinafter, the maintenance part in the document conveyance unit 109, which can be replaced by a user, is called an ADF maintenance kit.

Following the above, the reading processing (generation processing of image data) performed by the scanner 108 is explained. At timing at which a document passes on the document glass 212, the document in touch with the document glass 212 is exposed by an optical unit 213. As a result of that, the reflected light from the document is transmitted in the direction of a lens 215 via a mirror unit 214. Then, the transmitted reflected light is collected by passing through the lens 215 and enters a CCD sensor 144. The CCD sensor 144 converts the incident light into a digital signal. The digital signal converted by the CCD sensor 144 is converted into image data and transferred to the storage 111. It is also possible for the scanner 108 to read a document 220 placed on a platen glass (document table) 221. In that case, the document is not conveyed and by scanning the document placed on the platen glass 221 while moving the optical unit 213 by a motor (not shown schematically), image data corresponding to one page is generated. A cover 250 is a cover that covers a part of the conveyance path of the document conveyance unit 109 and configured so as to be capable of opening and closing. It is possible for a user to perform a replacement work of the ADF maintenance kit, and the like by opening the cover 250.

Next, the image forming processing performed by the printer 106 is explained. The printer 106 has an attachment portion to which the toner container (storage container) 12 storing toner of each color is attached and an attachment portion to which drum cartridges 3 (3C, 3M, 3Y, 3K) including the photoconductor drums 6 (6C, 6M, 6Y, 6K) of each color are attached. Further, the printer 106 has an exposure unit, not shown schematically, for irradiating the photoconductor drums 6 of each color with laser light and the intermediate transfer belt 7. Furthermore, the printer 106 has primary transfer rollers 5 (5C, 5M, 5Y, 5K) as primary transfer units, a secondary transfer roller 8 as a secondary transfer unit, and an attachment portion to which the fixing unit 55 is attached.

The drum cartridges 3 each have the photoconductor drum 6, a charging unit, not shown schematically, a developing unit, and a cleaner, which are arranged around the photoconductor drum 6. The drum cartridges 3 are replenished with toner from the toner containers 12 (12C, 12M, 12Y, 12K) via a path, not shown schematically.

The intermediate transfer belt 7 is tensioned by a plurality of tension rollers and arranged next to the drum cartridge 3 and comes into contact with each photoconductor drum 6. At the position in opposition to each photoconductor drum 6 with the intermediate transfer belt 7 being sandwiched in between, the primary transfer roller 5 is arranged. The intermediate transfer belt 7 such as this travels in an arrow direction in FIG. 2 between the photoconductor drum 6 and the primary transfer roller 5 by one roller (drive roller) of the plurality of tension rollers connected to a motor, not shown schematically, being rotated and driven. On the downstream side in the traveling direction of the intermediate transfer belt 7, the secondary transfer roller 8 is arranged so as to come into contact with the intermediate transfer belt 7 and a secondary transfer unit T2 is formed by the secondary transfer roller 8 and the intermediate transfer belt 7. An exposure unit, not shown schematically, is arranged on the opposite side of the intermediate transfer belt 7 of each drum cartridge 3 and irradiates each photoconductor drum 6 with laser light based on an printing-target image.

The fixing unit 55 is arranged downstream (upper side in FIG. 2) of the secondary transfer unit T2 and applies heat and pressure to a sheet carrying a toner image and fixes the toner image onto the sheet. Further, the printer 106 has a plurality of cassettes 356 (356A, 356B) storing sheets and picks up a sheet from the cassette 356 and conveys the sheet so as to pass through the secondary transfer unit T2 and the fixing unit 55. Then, the printer 106 discharges the sheet having passed through the secondary transfer unit T2 and the fixing unit 55 and onto which the toner image has been fixed to a discharge port 313. Further, the printer 106 also has an inversion conveyance mechanism 57 that inverts and conveys a sheet for performing double-side printing.

Following the above, the image forming process that is implemented by each unit in cooperation with one another is explained specifically. First, the surface of the photoconductor drum 6 of each color is charged by the charging unit and exposed by the exposure unit. By the exposure by the exposure unit, a latent image is formed on the photoconductor drum 6. By the latent image formed on the photoconductor drum 6 being developed by the developing unit, a toner image is formed on the photoconductor drum 6. The toner image formed on the photoconductor drum 6 arrives at a primary transfer unit T1 where the photoconductor drum 6 and the intermediate transfer belt 7 come into contact with each other. Then, in the primary transfer unit T1, by a primary transfer bias being applied to the first transfer roller 5, the toner image on the photoconductor drum 6 is transferred sequentially onto the intermediate transfer belt 7 and a full-color toner image is formed on the intermediate transfer belt 7. This toner image is conveyed to the secondary transfer unit T2 by the intermediate transfer belt 7 traveling.

On the other hand, a sheet fed from the cassette 356 is conveyed toward the secondary transfer unit T2. At that time, the printer 106 sends out the sheet one by one from the cassette 356 by a pickup roller 10 and after adjusting the conveyance timing of the toner image on the intermediate transfer belt 7 and the sheet by a registration roller 9, the printer 106 conveys the sheet to the secondary transfer unit T2. In the secondary transfer unit T2, by a secondary transfer bias being applied to the secondary transfer roller 8, the toner image on the intermediate transfer belt 7 is transferred secondarily onto the sheet. After that, the sheet onto which the toner image has been transferred is conveyed to the fixing unit 55 and by receiving heat and pressure in the fixing unit 55, the toner fuses and colors are mixed, and the toner image is fixed onto the sheet as a print image. The sheet onto which the print image has been fixed is discharged to the discharge port 313 in the state where the print surface of the sheet faces downward by a discharge roller 18 provided downstream (upper side in FIG. 2) of the fixing unit 55. The toner (remaining toner after transfer) that remains on the surface of the photoconductor drum 6 after the process of the primary transfer is removed from the surface of the photoconductor drum 6 by a cleaner and collected within the collected toner container 2. A discharge sensor 315, a double-side conveyance sensor 316, and a pre-registration sensor 317 are sensors that detect the presence/absence of stagnation of a sheet and used for detection of the occurrence of a jam, and the like.

Following the above, management of the life of a maintenance part is explained. The life of maintenance parts, such as the toner container, the collected toner container, the photoconductor drum, the fixing unit, and the document feed roller, is managed appropriately. In the present embodiment, the controller 130 of the image forming apparatus 100 manages the degree of use (also called life value) and the number of remaining days indicating the remaining period during which the maintenance part can be used as the life of the maintenance part. In the following, in a case of a representation of "number of remaining days", it is assumed that the remaining time until replacement of the maintenance part becomes necessary, or the like, is included, in addition to the number of remaining days until replacement of the maintenance part becomes necessary. Consequently, there is a case where "number of remaining days" is represented as "remaining time".

First, degree of use derivation processing performed by the controller 130 is explained. For example, the degree of use of the toner container is derived based on the record of operation of the maintenance part, such as the number of times of replenishment of toner for each drum cartridge and the remaining amount detection by a sensor. At that time, it may also be possible to take into consideration the dot count obtained by counting the number of colored dots of an image to be printed, and the like, in addition to the record of operation. Further, the degree of use of the collected toner container, the photoconductor drum, the fixing unit, and the document feed roller is derived based on the record of operation, such as the number of sheets passed, the distance traveled, and the number of rotations.

Following the above, the estimation processing of the number of remaining days performed by the controller 130 is explained. The number of remaining days is estimated based on the degree of use of each maintenance part, the number of days of operation of each maintenance part, and the like. For example, the CPU 101 derives the average amount of use per day of each maintenance part based on the degree of use of each maintenance part, the number of days of operation of each maintenance part, and the like. Then, the CPU 101 estimates the number of remaining days based on the current degree of use and the average amount of use of each maintenance part. The estimation method of the number of remaining days is not limited to this and for example, it is also possible to derive an estimated value indicating the number of remaining days by using the multiple regression analysis or the like. Further, for example, it is also possible to estimate an estimated value indicating the number of remaining days by performing a construction (also called training) of a learning model by performing machine learning using the data of various records of operation as input data and by using the constructed learning model. It may also be possible for the image forming apparatus 100 and a cloud server (not shown schematically) to perform the construction processing of a learning model and the estimation processing in cooperation with each other. The degree of use of each maintenance part and the number of remaining days of each maintenance part thus obtained are stored in the storage 111.

The prediction equation that is used at the time of deriving the degree of use and the number of remaining days described above is laid out so that the life is derived with a higher accuracy by combining a variety of parameters. Consequently, in a case of pursuing a higher accuracy, it is not necessarily possible to determine one prediction equation that is used for derivation of a life. For example, a case where it is desired to switch the prediction equation to another is considered, such as a case where a prediction equation with a high accuracy is laid out by changing the layout of parameters and a case where a prediction equation for each client, which takes into consideration the installation environment of the image forming apparatus 100 and the use method of a user, is laid out. Further, a case is considered where it is desired to selectively switch a prediction equation in accordance with the use environment, the condition, and the like of a user by preparing a plurality of patterns thereof. By supposing such a case, the image forming apparatus 100 of the present embodiment stores in advance a plurality of patterns of the prediction equation and switches the prediction equation to be applied in accordance with instructions from a user. At that time, in a case where a prediction by the multiple regression analysis or the learning model as described previously is performed, on a condition that the prediction equation is switched after the start of use of the maintenance part, there is a possibility that it is no longer possible to derive an accurate life by the prediction equation after the switching. For example, there is a case where the prediction equation a user desires to use anew uses information that is not used by the prediction equation used so far. In this situation, there is a case where it is not possible to acquire accurate information that is not used so far until the maintenance part in use is replaced. Consequently, in such a case, the image forming apparatus 100 switches the prediction equation at the time of next replacement of the maintenance part. Due to this, it is possible to start learning from the state where the record of operation is reset, and therefore, it is made possible to derive an accurate life by the prediction equation after the switching.

Following the above, by using FIG. 3, management of the prediction equation that is used for derivation of the life of each maintenance part is explained. FIG. 3 is a diagram showing an example of a maintenance part life management table 300 (hereinafter, simply described as management table 300) stored in the RAM 104 or the storage 111. In the management table 300, the value is updated each time the provisional calculation of the number of remaining days is performed. As shown in FIG. 3, the management table 300 is a table storing a maintenance part that a service engineer or the like can replace and information relating to the life of the maintenance part in association with each other. By causing the storage device incorporated in the maintenance part to store the remaining amount of the maintenance part and the number of remaining days calculated provisionally, it is made possible to acquire the remaining amount and the number of remaining days at the time of reattachment of the maintenance part even though the maintenance part is removed from the image forming apparatus 100. In the management table 300, in association with Maintenance part 301, Model number 302, Maintenance part ID 303, Prediction equation ID currently being applied (hereinafter, described as Currently-being-applied prediction equation ID) 304, Degree of use 305, Number of remaining days 306, and Prediction equation ID reserved (hereinafter, described as Reserved prediction equation ID) 307 are stored. Maintenance part 301 is information indicating the name of the maintenance part that is attached to the image forming apparatus, such as the toner container of each color, the collected toner container, the photoconductor drum of each color, the fixing unit, and the document feed roller. Model number 302 is identification information for identifying between the maintenance parts attached to different kinds of image forming apparatus, for example, such as a high-speed apparatus and a low-speed apparatus. This identification information is used at the time of ordering the maintenance part. Maintenance part ID 303 is identification information for specifying the maintenance part. Currently-being-applied prediction equation ID 304 is the prediction equation ID of the prediction equation currently being applied for derivation of the life of the maintenance part. The prediction equation ID is identification information capable of uniquely specifying the prediction equation. In the present embodiment, the prediction equation corresponding to each prediction equation ID is stored in the ROM 102 or the storage 111 in the form of program. Degree of use 305 is the degree of use at the current point in time of the maintenance part and updated accompanying the derivation processing described previously. Number of remaining days 306 is the number of remaining days until the end of life of the maintenance part is reached and updated accompanying the estimation processing described previously. Reserved prediction equation ID 307 is the prediction equation ID of the prediction equation that is applied at the time of next part replacement. In a case where although a switching setting of a prediction equation is performed by a service engineer or the like, it is not possible to immediately switch to the prediction equation specified by the switching setting, the prediction equation ID of the specified prediction equation is stored as Reserved prediction equation ID 307. Then, at the time of next part replacement, switching to the prediction equation corresponding to Reserved prediction equation ID 307 is performed. The hyphen "-" in FIG. 3 indicates that no prediction equation is reserved for the corresponding maintenance part. The data structure of the management table 300 is not limited to the table as shown in FIG. 3 and may have a data structure other than that.

Figure 5:
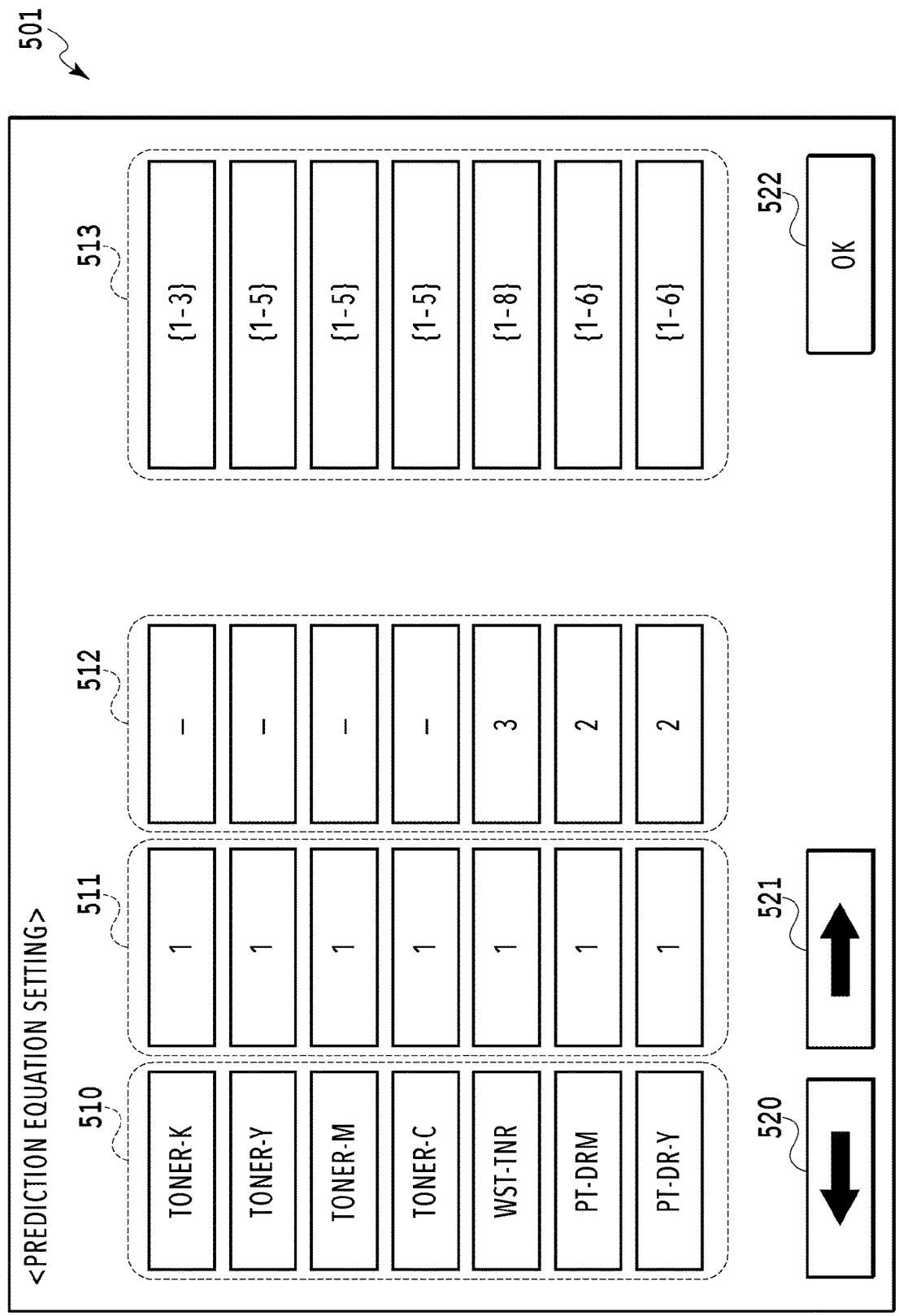
FIG. 5 is a diagram showing an example of a user interface screen for setting a threshold value reach alarm.

Following the above, a user interface screen (UI screen) for performing setting relating to a maintenance part is explained. FIG. 4 is a diagram showing an example of the situation check/abort screen that is displayed on the operation unit 113. FIG. 5 is a diagram showing an example of a UI screen for setting a prediction equation (hereinafter, called prediction equation setting screen). The UI screens in FIG. 4 and FIG. 5 are displayed on the operation unit 113 based on display data generated by the CPU 101 executing programs stored in the storage 111.

First, by using FIG. 4, the situation check/abort screen is explained. In a case where the situation check/abort key comprised by the operation unit 113 is pressed down by a user, a Situation check/abort screen 401 is displayed on the operation unit 113 by the CPU 101. The Situation check/abort screen 401 includes a main display area 410 and a status display area 420. Although a button to abort a job being performed, and the like are included actually in the Situation check/abort screen 401, for simplification of the drawing, those are omitted in FIG. 4.

In the status display area 420, a message corresponding to a maintenance event that has occurred in the image forming apparatus 100 is displayed. A maintenance event occurs in a case where some maintenance becomes necessary within the image forming apparatus 100 and for example, occurs in a case where a paper jam occurs in the printer 106 or in a case where replacement of a maintenance part becomes necessary. In a case where a plurality of maintenance events has occurred, the message corresponding to the maintenance event is displayed alternately in the status display area 420. In FIG. 4, a message "Amount of toner (black/yellow) has become small. Prepare for replacement." that is displayed in a case where replacement of toner containers of black and yellow becomes necessary is shown as an example.

The main display area 410 includes an Item display field 411, a Model number display field 412, a State display field 413, a Number of remaining days display field 414, and an OK key 415. The OK key 415 is a key for terminating the Situation check/abort screen 401 and in a case where the OK key 415 is pressed down, the CPU 101 terminates the display of the Situation check/abort screen 401 and displays another screen (not shown schematically). In the Item display field 411, maintenance parts, for example, such as the toner container of each color, the collected toner container, the photoconductor drum of each color, the fixing unit, and the document feed roller, are displayed in a list. In the Model number display field 412, the model number of each maintenance part being displayed in the Item display field 411 is displayed. This model number corresponds to Model number 302 shown in FIG. 3. In the State display field 413, an indicator and a percentage indicating the degree of use of the maintenance part are displayed. In a case where the degree of use is below a predetermined threshold value (for example, 5%), in the State display field 413, a predetermined threshold value is displayed in place of the degree of use. For example, "within 5%" is displayed. In a case where the degree of use becomes below a predetermined threshold value, there is a possibility that a user replaces the maintenance part despite that the maintenance part can still be used. Because of this, in a case where the degree of use becomes below a predetermined threshold value, by displaying a predetermined threshold value in place of the degree of use, a user is suppressed from replacing the maintenance part and caused to use up the maintenance part to the last. In the Number of remaining days display field 414, the number of remaining days of the maintenance part is displayed in an aspect in which it is possible for a user to grasp the state of the maintenance part both intuitively and easily. Specifically, in a case where the predicted number of remaining days is more than 364, "1 year or more" is displayed. The reason is that it is made possible for a user to intuitively learn that the replacement of the maintenance part will not become necessary for a while for the maintenance part whose replacement will not become necessary for a while. Here, although 364 days are taken as a threshold value as an example, this is not limited. For example, it may also be possible to take half a year (182 days) as a threshold value. In this case, on a condition that the number of remaining days of the maintenance part is more than half a year, it is sufficient to display "half a year or more" or the like. Further, in a case where the predicted number of remaining days is below eight, "within 7 days" is displayed. In a case where the predicted number of remaining days becomes below a predetermined threshold value, there is a possibility that a user replaces the maintenance part despite that the maintenance part can still be used as described above. Consequently, in the Number of remaining days display field 414 also, by displaying a predetermined threshold value in place of the number of remaining days, a user is suppressed from replacing the maintenance part and caused to use up the maintenance part to the last. Further, in a case where the estimated number of remaining days reaches zero, "replacement is necessary" is displayed. In this manner, in the present embodiment, the display in the Number of remaining days display field 414 is produced in a display aspect in which it is possible for a user to understand the number of remaining days both intuitively and easily in accordance with the level thereof. The display data in the Item display field 411, the Model number display field 412, the State display field 413, and the Number of remaining days display field 414 is generated by the image forming apparatus 100 referring to the management table 300 stored in the storage 111.

Following the above, by using FIG. 5, the prediction equation setting screen is explained. In a case where a prediction equation setting button (not shown schematically) within the situation check/abort screen is pressed down by a user, a Prediction equation setting screen 501 is displayed on the operation unit 113 by the CPU 101. The Prediction equation setting screen 501 includes areas 510 to 513 and buttons 520 to 522. In the area 510, the maintenance part ID is displayed. The image forming apparatus 100 enumerates the maintenance part ID of each maintenance part registered in the management table 300 in the area 510. In a case where it is not possible to include the maintenance part IDs of all the maintenance parts registered in the management table 300 in the area 510, those maintenance part IDs are divided into a plurality of pages and displayed. The buttons 520 and 521 are buttons for switching display-target pages in a case where the maintenance part IDs are divided into a plurality of pages and displayed. In the area 511, an identifier capable of identifying the prediction equation currently being applied to each maintenance part is displayed. The image forming apparatus 100 refers to the management table 300 and acquires the currently-being-applied prediction equation ID corresponding to each maintenance part, and displays an identifier capable of specifying the acquired currently-being-applied prediction equation ID in the area 511. In the present embodiment, in the area 511, the portion of the figure of the currently-being-applied prediction equation ID is displayed. For example, in the management table 300, as the currently-being-applied prediction equation ID of a maintenance part "TONER-K", "LGC_1_TONER-K" is stored, and therefore, in the first row of the area 511 (row corresponding to maintenance part "TONER-K"), "1" is displayed. In a case where the currently-being-applied prediction equation ID of the maintenance part "TONER-K" is "LGC_2_TONER_K", "2" is displayed in the first row of the area 511. "LGC" is an abbreviation of LOGIC. In the area 512, the identifier capable of specifying the reserved prediction equation is displayed. The image forming apparatus 100 refers to the management table 300 and acquires the reserved prediction equation ID corresponding to each maintenance part, and displays the number capable of specifying the acquired reserved prediction equation ID in the area 512. In the present embodiment, in the area 512, the portion of the figure of the reserved prediction equation ID is displayed. For example, in the management table 300, as the reserved prediction equation ID of a maintenance part "WST-TNR", "LGC_3_WST-TNR" is stored, and therefore, in the fifth row of the area 512 (row corresponding to maintenance part "WST-TNR"), "3" is displayed. For the maintenance part whose reserved prediction equation ID is not registered in the management table 300 (maintenance part whose reserved prediction equation ID is "-"), "-" is displayed in the area 512. In the area 513, the range of the prediction equation ID that can be set in the area 512 is displayed. For example, {1-3} in the first row of the area 513 (row corresponding to maintenance part ID "TONER-K") indicates that three prediction equations identified by "LGC_1_TONER-K", "LGC_2_TONER-K", and "LGC_3_TONER-K" are stored. A service engineer or the like selects the row of the change-target maintenance part in the area 512 in a case of desiring to change the prediction equation of the maintenance part. Then, the selected row enters an input possible state, and therefore, a service engineer or the like inputs the number corresponding to the prediction equation ID that is desired to be switched and presses down the OK button 522. At this time, in a case where the prediction equation corresponding to the input number is a prediction equation that cannot be switched immediately like the prediction equation by the multiple regression analysis or the learning model, the input number is displayed in the area 512 as it is. On the other hand, in a case where the prediction equation corresponding to the input number is a prediction equation that can be switched immediately, the number displayed in the area 511 is overwritten by the input number and "-" is displayed in the area 512. It is assumed that the number is input by a ten-key (not shown schematically) or the like comprised by the operation unit 113. In a case where the value being displayed in the areas 511 and 512 is changed, the image forming apparatus 100 updates Currently-being-applied prediction equation ID 304 and Reserved prediction equation ID 307 in the management table 300 based on the contents after the change.

It may also be possible for the image forming apparatus 100 to send back display information on the UI screen shown in FIG. 5 to a terminal device that is used by a service engineer and a person in charge of maintenance in response to the request from the device. According to the aspect such as this, it is made possible to change the setting (prediction equation setting) of the image forming apparatus 100 remotely without the need for a service engineer or a person in charge of maintenance to go to the installation position of the image forming apparatus 100.

Figure 6:
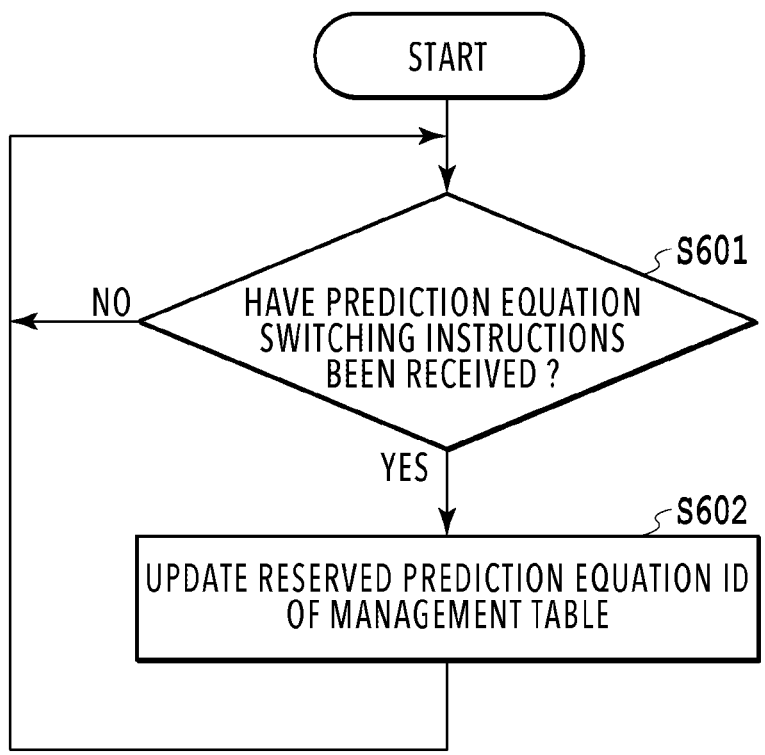
FIG. 6 is a flowchart of reception processing of prediction equation switching instructions in the first embodiment.
Figure 7:
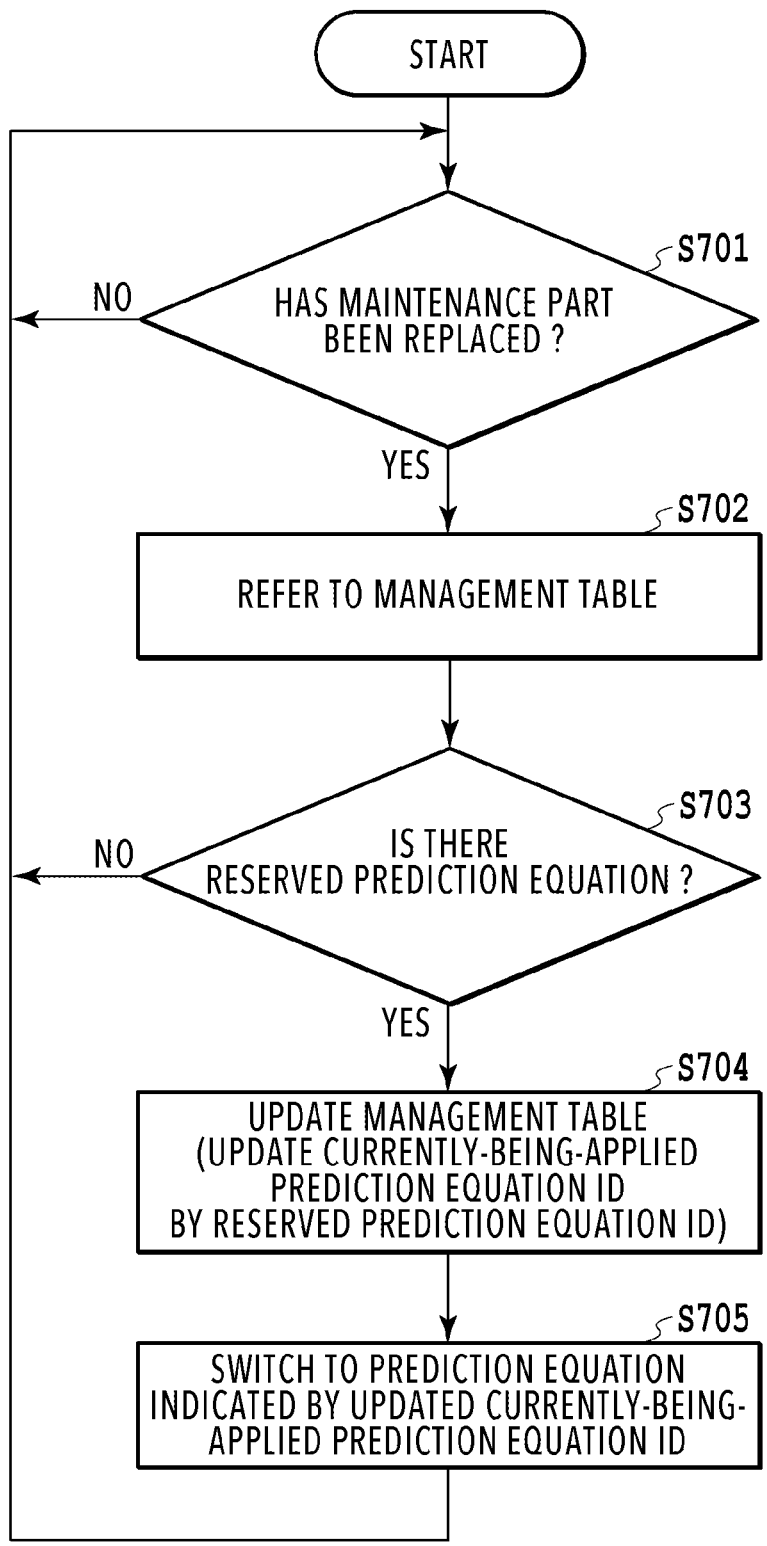
FIG. 7 is a flowchart of prediction equation switching processing in the first embodiment.

Following the above, by using FIG. 6 and FIG. 7, the operation of the image forming apparatus 100 in a case of switching the prediction equation is explained. FIG. 6 and FIG. 7 are each a flowchart showing the control of the image forming apparatus 100. Each piece of processing shown in the flowcharts in FIG. 6 and FIG. 7 is implemented by the CPU 101 reading a program for implementing each control module, which is stored in the ROM 102 or the storage 111, onto the RAM 104 and executing the program.

First, by using FIG. 6, reception processing of prediction equation switching instructions is explained. Here, a case is explained where all the prediction equations stored in the image forming apparatus 100 are prediction equations that cannot be switched immediately like the prediction equation by the multiple regression analysis or the learning model. The controller 130 of the image forming apparatus 100 determines whether or not prediction equation switching instructions from a user have been received via the Prediction equation setting screen 501 (S601). In a case where the switching instructions have been received (YES at S601), the controller 130 updates Reserved prediction equation ID 307 of the management table 300 in accordance with the contents of the received switching instructions (S602).

Following the above, by using FIG. 7, prediction equation switching processing is explained. In a case where the prediction equation of a maintenance part, for which switching instructions have been received, is a prediction equation that cannot be switched immediately, as described above, the prediction equation is switched at the time of next part replacement for the maintenance part. Consequently, the controller 130 switches the prediction equation in accordance with the timing of part replacement as follows.

First, the controller 130 determines whether the maintenance part has been replaced (S701). Specifically, by various sensors mounted on the printer 106, the scanner 108, and the document conveyance unit 109, it is detected that the maintenance part has been replaced and the controller 130 is notified that the maintenance part has been replaced via the printer control unit 105 and the image reading control unit 107. The controller 130 determines whether the maintenance part has been replaced based on whether or not the notification is given. In a case where it is detected that the maintenance part has been replaced (YES at S701), the controller 130 refers to the management table 300 and searches for the maintenance part ID of the replaced maintenance part (S702). Then, the controller 130 determines whether a reserved prediction equation ID associated with the maintenance part ID of the replaced maintenance part is stored, that is, whether or not there is a prediction equation reserved for the replaced maintenance part (S703). In a case where no reserved prediction equation ID is stored, that is, in a case where Reserved prediction equation ID 307 of the management table 300 is "-" (NO at S703), the controller 130 returns to the processing at S701 and stands by until a maintenance part is replaced anew. In a case where a reserved prediction equation ID is stored (YES at S703), the controller 130 stores "-" in Reserved prediction equation ID 307 as well as storing the reserved prediction equation ID in Currently-being-applied prediction equation ID 304 of the management table 300 (S704). After that, the controller 130 reads the prediction equation identified by the prediction equation ID stored in Currently-being-applied prediction equation ID 304 at S704 from the ROM 102 or the storage 111 onto the RAM 104. Then, the controller 130 starts derivation of a life of the replaced maintenance part by using the read prediction equation (S705).

By performing the control as above, it is made possible for a service engineer or the like to select a prediction equation to be applied to each maintenance part from among prediction equations in a plurality of patterns stored in the image forming apparatus 100 and set the selected prediction equation. Due to this, it is made possible for a service engineer or the like to set an intended prediction equation at intended timing. Consequently, it is made possible to appropriately perform management of a life of a maintenance part.

Further, by the Prediction equation setting screen 501, it is made possible for a service engineer or the like to grasp the prediction equation being applied to each maintenance part. Due to this, it is made possible to manage also a prediction equation updated at timing not intended by a service engineer or the like. For example, even in a case where the prediction equation being applied is updated at the time of upgrading of the version of the firmware of the image forming apparatus, it is possible to grasp the prediction equation after the updating. Due to this, for example, in a case where a bug is found in the prediction equation after the updating, it is made possible for a service engineer or the like to take measures, such as to return the prediction equation to that before the updating. Further, for example, in a case where a deviation is found between the predicted life and the actual wear for a certain maintenance part, it is possible for a service engineer or the like to grasp by which prediction equation the life of the maintenance part is derived. Consequently, it is made possible to take measures to switch the prediction equation applied to the maintenance part to another prediction equation more suitable to the use environment, and so on.

Second Embodiment

In the first embodiment, the prediction equation switching processing is explained by taking the case as an example where it is not possible to immediately switch the prediction equation stored in the image forming apparatus 100. Note that, there is also a case where a prediction equation that can be switched immediately is included in the prediction equations stored in the image forming apparatus 100. Consequently, in a second embodiment, explanation is given to prediction equation switching in the image forming apparatus 100 that stores both the prediction equation that can be switched immediately and the prediction equation that cannot be switched immediately in the ROM 102 or the storage 111.

Figure 8:
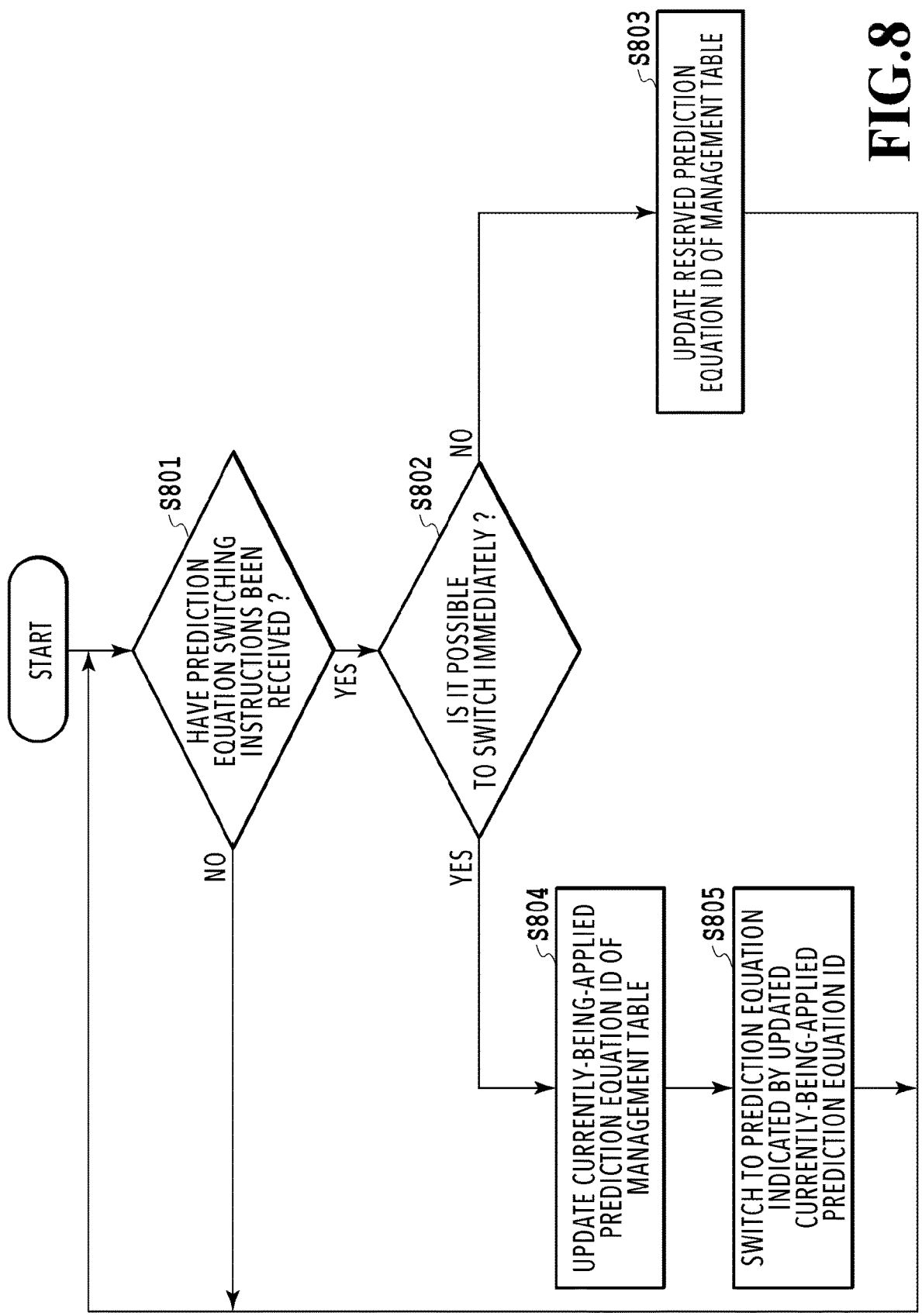
FIG. 8 is a flowchart of reception processing of prediction equation switching instructions in a second embodiment.

By using FIG. 8, reception processing of prediction equation switching instructions in the second embodiment is explained. FIG. 8 is a flowchart of the reception processing of prediction equation switching instructions. Each piece of processing shown in the flowchart in FIG. 8 is implemented by the CPU 101 reading a program for implementing each control module stored in the ROM 102 or the storage 111 onto the RAM and executing the program.

The controller 130 of the image forming apparatus 100 determines whether or not prediction equation switching instructions from a user have been received via the Prediction equation setting screen 501 (S801). In a case where switching instructions have been received (YES at S801), the controller 130 determines whether or not the prediction equation after the switching, which is specified by the switching instructions, is a prediction equation that can be switched immediately (S802). Whether or not a prediction equation can be switched immediately is determined in advance at the time of layout of the prediction equation. Consequently, in the present embodiment, information indicating whether or not a prediction equation can be switched immediately is stored in advance in the storage 111 and the ROM 102 as attachment information on the prediction equation. The prediction equation that can be switched immediately is, for example, a prediction equation that uses data accumulated internally by the image forming apparatus 100 at all times as parameters. It may also be possible to store information indicating whether or not the prediction equation can be switched immediately in the management table 300 along with the currently-being-applied prediction equation ID. Due to this, it is possible for a service engineer or the like to grasp that the prediction equation currently being applied to a certain maintenance part is applied on the way of use of the maintenance part.

In a case where the prediction equation after the switching specified by the switching instructions is a prediction equation that cannot be switched immediately (NO at S802), the controller 130 updates the reserved prediction equation ID of the maintenance part of the management table 300 (S803) and returns to the processing at S801. On the other hand, in a case where of determining that the prediction equation of the maintenance part, for which the switching instructions have been received, is a prediction equation that can be switched immediately (YES at S802), the controller 130 performs the processing at S804 and S805 and returns to the processing at S801. The processing at S804 and S805 is the same as the processing at S704 and S705, and therefore, explanation is omitted.

As above, in the present embodiment, in a case where the prediction equation switching instructions are received for a certain maintenance part, on a condition that the new prediction equation specified by the switching instructions is a prediction equation that can be switched immediately, the currently-being-applied prediction equation is switched immediately to the new prediction equation. Consequently, even in a case where a problem or the like is found in the currently-being-applied prediction equation, on a condition that the new prediction equation specified by the switching instructions can be switched immediately, it is made possible to switch the prediction equation without the need to wait for the time of next maintenance part replacement. Consequently, it is made possible to more appropriately perform management of a life of a maintenance part.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present embodiment, it is possible to appropriately mange a maintenance part that is attached to an apparatus, such as an image forming apparatus, and which needs replacement accompanying the operation of the apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-232657, filed Dec. 12, 2018, which is hereby incorporated by reference wherein in its entirety.

What is claimed is:

1. An apparatus configured to attach at least one predetermined kind of a part, the apparatus comprising:
a storage device storing a first prediction equation that uses a first type of data and a second prediction equation that uses a second type of data;
one of more processors configured to:
set the first prediction equation for predicting a remaining lifetime of a first part of the predetermined kind attached to the apparatus;
predict the remaining lifetime of the first part using the first prediction equation;
receive, from a user, an instruction to change the first prediction equation to the second prediction equation;
detect an attachment of a second part of the predetermined kind to the apparatus in place of the first part; and
change, upon detecting the attachment of the second part after receiving the instruction, the first prediction equation to the second prediction equation to predict the remaining lifetime of the second part attached to the apparatus.

2. The apparatus according to claim 1, wherein:
the storage device stores a third prediction equation that uses the first type of data,
the one or more processors are further configured to:
receive, from the user, an instruction to change the first prediction equation to the third prediction equation; and
change the first prediction equation to the third prediction equation to predict the remaining lifetime of the first part from the first prediction equation to the third prediction equation, without waiting for the detection of the attachment of the second part.

3. The apparatus according to claim 1, wherein the one or more processors control a display device to display a user interface screen for receiving the instruction.

4. The apparatus according to claim 3, wherein:
the storage device stores a plurality of prediction equations, including the first and second prediction equations, for a plurality of parts whose kinds are different, including the first part and the second part, that are attachable to the apparatus, and
the user interface screen includes a first area for specifying one of the plurality of prediction equations to each of the plurality of parts attached to the apparatus.

5. The apparatus according to claim 4, wherein the user interface screen further includes a second area that displays identification information associated with one of the plurality of prediction equations currently being applied to each of the plurality of parts attached to the apparatus.

6. The apparatus according to claim 5, wherein the user interface screen further includes a third area that displays the identification information associated with the plurality of prediction equations specified by the instruction for the plurality of parts attached to the apparatus.

7. The apparatus according to claim 6, wherein, in a case where the one or more processors receive the instruction, the third area displays the identification information associated with one of the plurality of prediction equations specified by the instruction for the respective part.

8. The apparatus according to claim 1, wherein the apparatus is an image forming apparatus that forms an image on a printing medium using a color material.

9. The apparatus according to claim 8, wherein the imaging forming apparatus attaches, as the part, at least one of a photoconductor drum, a toner container, a fixing unit, a collected toner container, or a document feed roller.

10. The apparatus according to claim 1, wherein the second type of data is data that is not collected during a period where the first prediction equation is set.

11. The apparatus according to claim 1, wherein the one or more processors control a display device to display identification information of the second prediction equation specified by the instruction.

12. The apparatus according to claim 1, wherein the one or more processors predict using the second prediction equation after detecting the attachment of the second part, even when the one or more processors receive the instruction before detecting the attachment of the second part.

13. A control method for an apparatus configured to attach at least one predetermined kind of a part, the method comprising:
storing, in a storage device, a first prediction equation that uses a first type of data and a second prediction equation that uses a second type of data;
setting the first prediction equation for predicting a remaining lifetime of a first part of the predetermined kind attached to the apparatus;
predicting the remaining lifetime of the first part using the first prediction equation;
receiving, from a user, an instruction to change the first prediction equation to the second prediction equation;
detecting an attachment of a second part of the predetermined kind to the apparatus in place of the first part; and
changing, upon detecting the attachment of the second part after receiving the instruction, the first prediction equation to the second prediction equation to predict the remaining lifetime of the second part attached to the apparatus.

14. An apparatus configured to receive a part set at a predetermined position, the apparatus comprising:
- a storage device storing a first prediction equation that uses a first type of data and a second prediction equation that uses a second type of data;
- one or more processors configured to:
  - set the first prediction equation for predicting a remaining lifetime of a first part set at the predetermined position;
  - predict the remaining lifetime of the first part using the first prediction equation;
  - receive, from a user, an instruction to change the first prediction equation to the second prediction equation;
  - detect setting of a second part at the predetermined position in place of the first part;
  - change, upon detecting the setting of the second part after receiving the instruction, the first prediction equation to the second prediction equation to predict the remaining lifetime of the second part at the predetermined position.

* * * * *